United States Patent
Moghe et al.

(10) Patent No.: US 6,477,369 B1
(45) Date of Patent: Nov. 5, 2002

(54) BROADBAND COMMUNICATION NETWORK

(75) Inventors: Sanjay Moghe, Minnetonka, MN (US); David Urban, Canonsburg, PA (US)

(73) Assignee: ADC Telecommunications, Inc., Minnetonka, MN (US)

( * ) Notice: Subject to any disclaimer, the term of this patent is extended or adjusted under 35 U.S.C. 154(b) by 0 days.

(21) Appl. No.: 09/409,118

(22) Filed: Sep. 30, 1999

(51) Int. Cl.[7] .............................. H04Q 7/20; H04B 7/14; H04B 7/15
(52) U.S. Cl. ................ 455/426; 455/15; 455/445; 455/11.1; 455/13.1; 370/316
(58) Field of Search .................. 455/426, 15, 445, 455/3.05, 3.01, 552, 553, 522, 523, 76, 557, 87, 42, 422, 403, 11.1, 17, 20, 22, 428, 446; 370/316, 328

(56) References Cited

U.S. PATENT DOCUMENTS

| | | | |
|---|---|---|---|
| 5,081,703 A | * | 1/1992 | Lee ........................... 455/13.1 |
| 5,303,287 A | * | 4/1994 | Laborde ...................... 455/426 |
| 5,406,615 A | * | 4/1995 | Miller, II et al. ........ 455/552 X |
| 5,604,789 A | * | 2/1997 | Lerman ................... 455/552 X |
| 5,734,982 A | * | 3/1998 | Endo et al. .................. 455/450 |
| 5,812,951 A | * | 9/1998 | Ganesan et al. ............. 455/445 |
| 5,930,708 A | * | 7/1999 | Stewart et al. ............. 455/13.1 |
| 5,949,766 A | * | 9/1999 | Ibanez-Meier et al. 455/13.1 X |
| 6,047,177 A | * | 4/2000 | Wickman .................... 455/422 |
| 6,132,306 A | * | 10/2000 | Trompower ................ 455/11.1 |
| 6,151,308 A | * | 11/2000 | Ibanez-Meier et al. ..... 370/316 |
| 6,188,873 B1 | * | 2/2001 | Wickman et al. .......... 455/11.1 |
| 6,243,577 B1 | * | 6/2001 | Elrefaie et al. ............. 455/426 |

FOREIGN PATENT DOCUMENTS

EP          0 468 688 A2  *   1/1992

* cited by examiner

Primary Examiner—Tracy Legree
(74) Attorney, Agent, or Firm—Fogg and Associates; David N. Fogg

(57) ABSTRACT

A wireless communication system. The wireless communication system includes a first wireless communication network communicating at a first range of frequency. The wireless communication system also includes a second wireless communication network that is communicatively coupled to the first wireless communication network. Additionally, the second wireless communication network communicates at a second, different range of frequency. Further the first communication network geographically overlaps with a select portion of the second communication network.

31 Claims, 3 Drawing Sheets

BROADBAND COMMUNICATION NETWORK

TECHNICAL FIELD

The present invention relates generally to the field of telecommunications and, in particular, to a system and method of communicating data.

BACKGROUND

As the need for information and entertainment by consumers grows, various pipelines have been developed to deliver this data to the different subscribers and users. A pipeline is a system that communicates data from a data provider (e.g., a television station, website on the Internet) to a subscriber. One current pipeline used by Internet service providers such as AmericaOnLine is the telephony system. The subscribers use a computer modem to connect to the Internet service provider over the telephony system. This system, however, is often ineffective for conveying large quantities of data because of bandwidth limitations. Some subscribers have installed higher-speed telephonic connections but due to the associated costs and technical issues this practice is not widespread.

Other pipelines deliver data with varying degrees of success. Conventionally, television stations use a wireless pipeline for its delivery system. The stations broadcast a signal in a dedicated portion of the electromagnetic spectrum and subscribers access the signal with roof-top antennas. Another conventional pipeline is the cable system which uses coaxial cable to deliver video with increased quality and quantity. Recent advances in the cable standards and products including the two-way cable modems have provided two-way communication between the service provider and the subscribers. In addition to the television broadcasting, this advance does allow for Internet access and telephony service over the traditional cable systems.

Recently, the industry has designed various types of fixed point to multipoint wireless systems which provide both one-way and two-way communications. One example of these types of systems is the Multichannel Multipoint Distribution Service (MMDS), traditionally used for television broadcasting. There has also been development of the Wireless Loop systems, providing a cost-efficient alternative to the copper wires in the local loop (i.e., the last segment in the telephony network deployment). Additionally, the Federal Communication Commission (FCC) recently approved the two-way use of MMDS thereby allowing a wide variety of interactive services within the MMDS spectrum including classic telephony, Internet access, data for business applications and interactive video.

Moreover, the FCC has also recently auctioned off a large amount of bandwidth (1.3 GigaHertz (GHz)) for two-way applications in the frequency range of 28 to 31 GHz known as Local Multipoint Distribution System (LMDS). Internationally LMDS is also employed under different names and at various frequencies within the range of 10 to 40 GHz for both one-way and two-way communications. As both the MMDS and LMDS employ wide bandwidth with the ability to deliver large amounts of information, they are categorized as broadband wireless systems.

The radio propagation, fading due to rain and snow, atmospheric attenuation as well as other characteristics are different for the MMDS frequency band and the LMDS frequency band. Further, the cost and performance of RF components is also different for these two different frequency bands. Accordingly, these factors as well as others have led to the deployment of MMDS networks having cell radii of approximately 30–100 kilometers and to the deployment of LMDS networks having cell radii of approximately 2–8 kilometers. Thus, more cells are required in an LMDS network when compared with an MMDS network. In turn, the costs of deploying services using an LMDS spectrum is higher when compared with the costs of deploying services using an MMDS spectrum. However, one advantage of deploying LMDS services over MMDS services is that the LMDS network has greater bandwidth and consequently greater transfer capacity when compared with the MMDS network.

For the reasons stated above, and for other reasons stated below which will become apparent to those skilled in the art upon reading and understanding the present specification, there is a need in the art for a communication system which provides for the maximizing of transfer capacity while minimizing costs associated with such a system.

SUMMARY

The above mentioned problems with communication systems and other problems are addressed by the present invention and which will be understood by reading and studying the following specification. A communication system is described which includes a number of wireless communication networks providing a number of different services at different frequencies (e.g., LMDS and MMDS) to a number of subscribers in defined geographical regions. Additionally, select portions of these number of wireless communication networks geographically overlap with one another. In one embodiment, the higher frequency networks are strategically placed where the density of subscribers is high within the geographic region of a lower frequency network. Advantageously, the deployment of this type of communication system effectively enables better use of data capacity for a communication system at lower costs than the currently deployed wireless networks.

In particular, an illustrative embodiment of the present invention includes a wireless communication system. The wireless communication system includes a first wireless communication network communicating at a first range of frequency. The wireless communication system also includes a second wireless communication network that is communicatively coupled to the first wireless communication network. Additionally, the second wireless communication network communicates at a second, different range of frequency. Further the first communication network geographically overlaps with a select portion of the second communication network.

DETAILED DESCRIPTION

In the following detailed description, reference is made to the accompanying drawings which form a part hereof, and in which is shown by way of illustration specific illustrative embodiments in which the invention may be practiced.

These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
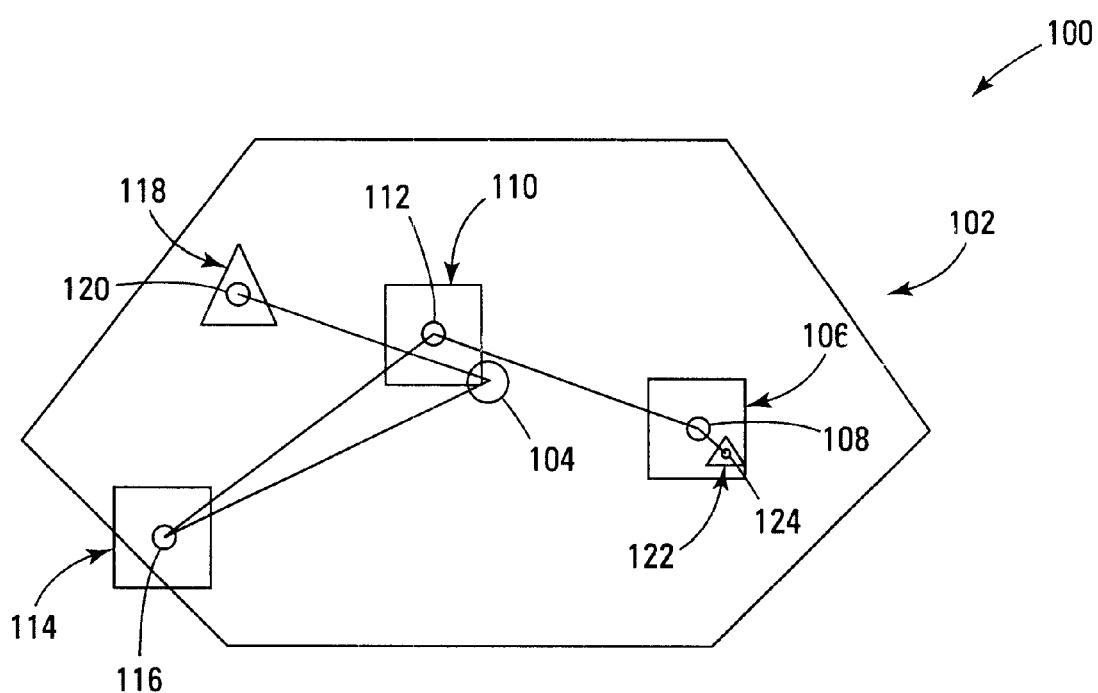
FIG. 1 is a representational diagram of an illustrative embodiment of a wireless communication system according to the teachings of the present invention.

FIG. 1 is a representational diagram of an illustrative embodiment of a wireless communication system according to the teachings of the present invention. In particular, FIG. 1 comprises wireless communication system 100 that includes first wireless communication network 102, which defines a geographical region (e.g., a cell) and includes communication circuit 104. Additionally, wireless communication system 100 includes second wireless communication networks 106, 110 and 114, which define geographical regions and include communication circuits 108, 112 and 116, respectively. Wireless communication system 100 also includes third wireless communication networks 118 and 122, which define geographical regions and include communication circuits 120 and 124, respectively.

As illustrated in FIG. 1, select portions of geographical regions of the first, second and third types of wireless communication networks overlap and/or are within one another. For example, second wireless communication network 110 geographically overlaps first wireless communication network 102.

Further, communication circuits 104, 108, 112, 116, 120 and 124 are communicatively coupled together. In one embodiment, communication circuits 104, 108, 112, 116, 120 and 124 are communicatively coupled together with narrow beam width, high gain antennas. In an alternative embodiment, communication circuits 104, 108, 112, 116, 120 and 124 are communicatively coupled together with a fiber optic link (e.g., SONET OC-3). In one embodiment, communication circuits 104, 108, 112, 116, 120 and 124 communicate in the LMDS spectrum. In an alternative embodiment, communication circuits 104, 108, 112, 116, 120 and 124 use a point-to-point wireless link back haul.

Communication system 100 provides for uni-directional or bi-directional communication of data between communication circuits 104, 108, 112, 116, 120 and 124 and a number of subscribers within their respective geographical regions of communication networks 102, 106, 110, 114, 118 and 122. Moreover, a communication circuit may include but is not limited to a base station, hub or other communication circuit that communicates RF signals in the designated frequency range and format for a wireless communication system. The communication system of FIG. 1 may include more or less communication networks and communication circuits of first, second and third types, but FIG. 1 is limited to the communication networks and communication circuits illustrated for sake of clarity. Further, communication circuits 104, 108, 112, 116, 120 and 124 can communicate audio, video or data for use by a computer, a television, a telephony system or other appropriate terminal of subscribers within the geographical regions of communication networks 102, 106, 110, 114, 118 and 122.

Figure 2:
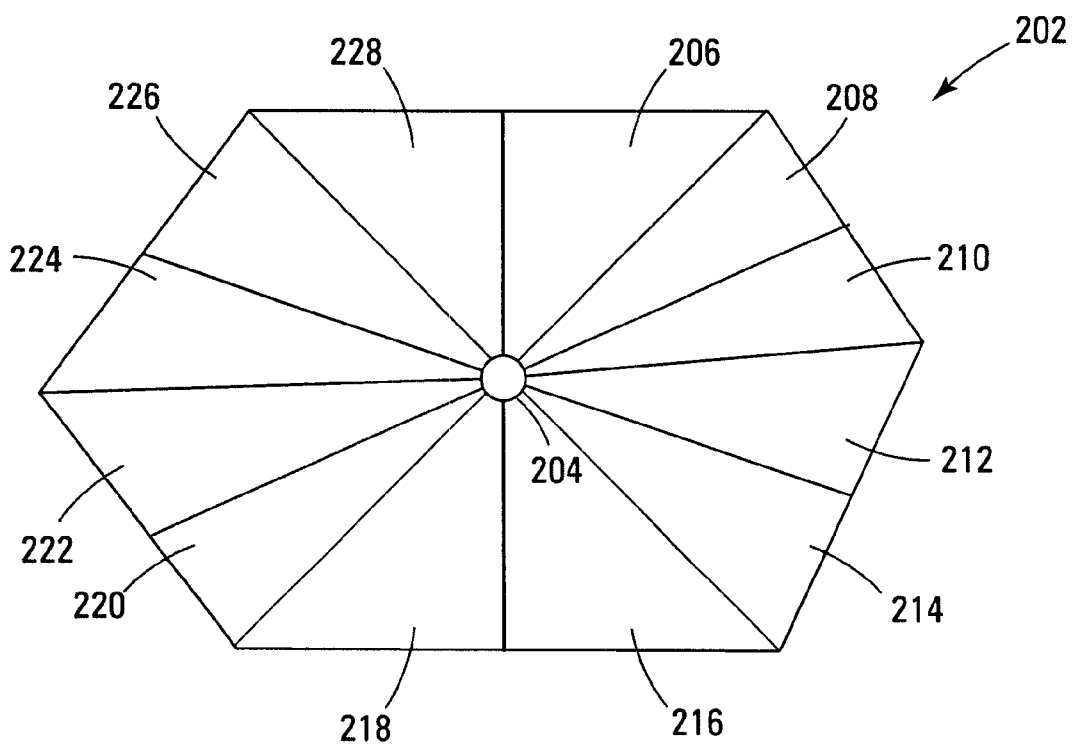
FIG. 2 is a representational diagram of a typical MMDS cell structure.

Moreover, first wireless communication network 102, second wireless communications networks 106, 110 and 114 and third wireless communication networks 118 and 122 communicate at a first range frequency, a second, different range frequency and a third, different range frequency, respectively. In one embodiment, first wireless communication network 102 is an MMDS network, whose communication circuit 104 communicates data to the subscribers in its geographical region within the MMDS frequency spectrum (e.g., 2.0–2.7 GigaHertz (GHz)). One such embodiment of an MMDS geographical region (e.g., cell) that has been sectorized, is illustrated in FIG. 2. In particular, FIG. 2 includes MMDS geographical region 202 with communication circuit 204. Additionally, MMDS geographical region 202 is broken into sectors 206–228. Accordingly, communication circuit 204 broadcasts a data signal having a particular frequency to a particular associated sector. The number of sectors shown is only representative. Other numbers of sectors can also be used as needed for a specific implementation.

Figure 3:
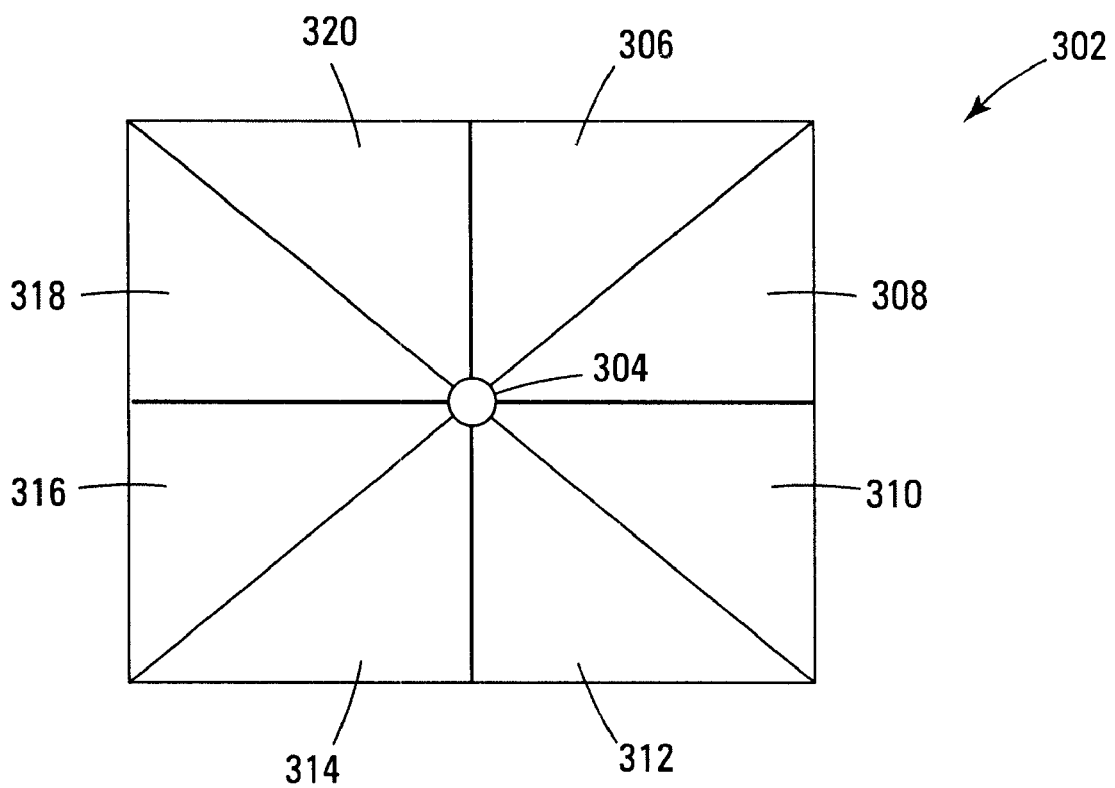
FIG. 3 is a representational diagram of a typical LMDS cell structure.

In one embodiment, second wireless communication networks 106, 110 and 114 are LMDS networks, whose respective communication circuits 108, 112 and 116 communicate data to the subscribers in their geographical regions within the LMDS frequency spectrum (e.g., 28–31 GHz). One such embodiment of an LMDS geographical region (e.g., cell) that has been sectorized, is illustrated in FIG. 3. In particular, FIG. 3 includes LMDS geographical region 302 with communication circuit 304. Additionally, LMDS geographical region 302 is broken into sectors 306–320. Accordingly, communication circuit 304 broadcasts a data signal having a particular frequency to a particular associated sector. The number of sectors shown is only representative. Other numbers of sectors can also be used as needed for a specific implementation.

In one embodiment, third wireless communication networks 118 and 122 are a third type of network, whose respective communication circuits 120 and 124 communicate data to the subscribers in their geographical regions within frequency bands not licensed by the FCC (e.g., 900, 2400, 5800 and 24000 MHZ). One example of a use of a third type of network would be the distributing of broad band wireless internet services to businesses within a large office building or even within an entire business park where MMDS and LMDS network solutions may not be cost effective from the user density and data rate requirement considerations. This type of situation is generally cost effective for applications requiring 1–10 T1 type of connections quickly in areas where it is difficult to get a wired connection.

Advantageously, the deployment of this hybrid network illustrated in FIG. 1 effectively enables better use of data capacity in a wireless network at lower costs than the currently deployed wireless networks. For example, for a particular geographical area (e.g., an entire city), the deployment can be customized to the number of subscribers within portions of this geographical area. Typically, a high bandwidth network ,i.e., a high frequency spectrum network (e.g., an LMDS network) includes more cells for a given area (i.e., greater deployment costs) because of lower cell radius due to radio propagation loss and rain attenuation, as described in the background section. Accordingly, an LMDS network is not an economically viable option for sections where the population density of users is low because the number of subscribers is less and thus the amount of bandwidth needed to accommodate such subscribers is also lower.

However, a low bandwidth network (e.g., an MMDS network) would be an economically viable option in such a situation. In particular, a low bandwidth network (i.e., a low frequency spectrum network) includes less cells for a given area (i.e., lesser deployment costs) because of greater cell radius due to less radio propagation loss and rain attenuation, as described in the background section.

In contrast, the deployment of a high bandwidth network in geographical areas, where the population density of subscribers is high, does make economic sense. In particular, a high bandwidth network, which include smaller cells, can be deployed, for example, in densely populated downtown areas and business parks, where the higher data capacity is needed and can be used. Accordingly, the advantage of this hybrid network versus the traditional LMDS-only or MMDS-only networks is that this deployment structure can offer coverage for a whole city right at the beginning of deployment at a lower cost while offering high data capacity for areas where the population density is large (e.g., downtown areas). Moreover, this type of network can be modified as the population density for the geographical area changes. For example, as more business parks are created, more LMDS cells could be deployed to account for the need for a higher bandwidth capacity for these areas. Thus, the cost savings for this hybrid structure could be high by deploying less LMDS cells initially and yet offering coverage to the entire geographical area.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the deployment of wireless communication systems, as described herein, may be varied by adding or subtracting communication networks and/or modifying the shape and size of the geographical regions of such communications networks and/or the geographical placement of such communication networks in relationship to one another and still fall within the scope of the present invention.

What is claimed is:

1. A wireless communication system comprising:
   a first wireless communication network communication at a first range or frequency; and
   a second wireless communication network, communicatively coupled to the first wireless communication network, communicating at a second, different range of frequency, wherein the first communication network geographically overlaps with a select portion of the second communication network such that the select portion is selected in response to a density of subscribers of the first and second, wireless communication networks.

2. The wireless communication system of claim 1, wherein the first wireless communication network includes an Multi-channel Multi-point Distribution Service (MMDS) network.

3. The wireless communication system of claim 1, wherein the second wireless communication network includes an Local Multi-point Distribution Service (LMDS) network.

4. The wireless communication system of claim 1, wherein the first wireless communication network includes a first base station that communicates data to a number of subscribers within a first geographical region and wherein the second wireless communication network includes a second base station that communicates data to a number of subscribers within a second geographical region.

5. The wireless communication system of claim 1, further comprising a third wireless communication network, communicatively coupled to the first and second wireless communication networks, communicating at a third, different range of frequency, wherein the third communication network is geographically within the second communication network.

6. The wireless communication system of claim 1, wherein the first wireless communication network is communicatively coupled to the second wireless communication network with narrow beam width, high gain antennas.

7. The wireless communication system of claim 1, wherein the first wireless communication network is communicatively coupled to the second wireless communication network with a fiber optic link.

8. A communication system comprising:
   a first communication network communication at a first range of frequency; and
   a second communication network, communicatively coupled to the first communication network, communicating at a second, different range of frequency, wherein the second communication network is geographically within a select portion of the first communication network such that the select portion is selected in response to a density of subscribers of the first and second communication networks.

9. The wireless communication system of claim 8, wherein the first wireless communication network includes ad Multi-channel Multi-point Distribution Service (MMDS) network.

10. The wireless communication system of claim 8, wherein the second wireless communication network includes a Local Multi-point Distribution Service (LMDS) network.

11. A wireless communication system comprising:
    a first base station communicating at a first range of frequency in a first geographical region; and
    a number of additional base stations, communicatively coupled to the first base station, communicating at a second, different range of frequency in a plurality of additional geographical areas, wherein the first geographical area overlaps with the number of additional geographical areas such that each of the number of additional base stations communicates with a higher density of subscribers than the first base station.

12. The wireless communication system of claim 11, wherein the first range of frequency includes 2.0–2.7 GigaHertz and wherein the second range of frequency includes 28–31 GigaHertz.

13. The wireless communication system of claim 11, wherein the first base station and the number of additional base stations communicates data, the data including audio data.

14. A wireless communication system comprising:
    a Multi-channel Multi-point Distribution Service (MMDS) network having an MMDS base station, the MMDS base station broadcasting within the MMDS frequency spectrum to a number of subscribers within an MMDS cell;
    a number of Local Multi-point Distribution Service (LMDS) networks, communicatively coupled to the MMDS network, having a number of LMDS base stations, the number of LMDS base stations broadcasting within the LMDS frequency spectrum to a number of subscribers within a number of LMDS cells; and
    a number of third wireless networks, communicatively coupled to the MMDS network and the number of LMDS networks, having a number of third wireless base stations, the number of third wireless base stations broadcasting within a third frequency spectrum to a number of subscribers within a number of third wireless cells, wherein the third frequency spectrum is lower than the MMDS and LMDS frequency spectrums, and wherein the number of LMDS cells and the number of third wireless networks are geographically located within the MMDS cell based on a density of subscribers within the MMDS cell.

15. A method of wireless communication comprising:

communicating data across a first geographical region at a first range of frequency with a first set of subscribers;

selecting a select portion of a second geographical region in response to a greater density of a second set of subscribers in the second geographical region; and communicating data across the second geographical region at a second, different range of frequency with the second set of subscribers, wherein the first geographical region overlaps with the select portion of the second geographical region.

16. The method of claim 15, wherein communicating data across the first geographical region includes performing wireless communication using Multi-channel Multi-point Distribution Service (MMDS).

17. The method of claim 15, wherein communicating data across the second geographical region includes performing wireless communication using Local Multipoint Distribution Service (LMDS).

18. The method of claim 15, wherein communicating data across the first geographical region includes communicating data from a first base station to a number of subscribers with the first geographical region and wherein communicating data across the second geographical region includes communicating data from a second base station to a number of subscribers with the second geographical region.

19. The method of claim 15, further comprising communicating data across a third geographical region at a third range of frequency, wherein the third geographical region is within the second geographical region.

20. A method of wireless communication comprising:

communicating data across: a first geographical region at a first range of frequency with a first set of subscribers;

selecting a select portion of a second geographical region in response to a greater density of a second set of subscribers in the second geographical region; and communicating data across the second geographical region at a second, different range of frequency with the second set of subscribers, wherein the first geographical region is within the select portion of the second geographical region.

21. The method of claim 20, wherein the data includes video data.

22. The method of claim 20, wherein communicating data across the first geographical region includes performing wireless communication using Multi-channel Multi-point Distribution Service (MMDS).

23. The method of claim 20, wherein communicating data across the second geographical region includes performing wireless communication using Local Multipoint Distribution Service (LMDS).

24. A method of wireless communication comprising:

communicating data across a first geographical region at a first range of frequency with a first set of subscribers;

selecting a select portion of the first geographical region in response to a greater density of a second set of subscribers in the select portion than a density of the first set of subscribers; and communicating data across a number of second geographical region at a second, different range of frequency with the second set of subscribers, wherein the number of second geographical regions geographically overlap with the select portion of the first geographical region.

25. The method of claim 24, wherein the first range of frequency includes 2.0–2.7 GigaHertz and wherein the second range of frequency includes 28–31 GigaHertz.

26. The method of claim 24, wherein data includes audio data.

27. A method of wireless communication system deployment, comprising:

placing a first base station within a first geographical region, wherein the first base station is capable of performing wireless communication with a first set of subscribers within the first geographical region;

determining a second geographical region having a second set of subscribers that have a higher subscriber density than the first set of subscribers; and placing a second base station within the second geographical region, the second base station communicatively coupled to the first base station, wherein the second base station is capable of performing wireless communication with the second set of subscribers and wherein the first geographical region overlaps the second geographical region.

28. The method of claim 27, wherein the first base station is capable of performing wireless communication with a number of subscribers within the first geographical region using Multi-channel Multi-point Distribution Service (MMDS).

29. The method of claim 27, wherein the second base station is capable of performing wireless communication with a number of subscribers within the second geographical region using Local Multi-point Distribution Service (LMDS).

30. The method of claim 27, wherein the first base station is communicatively coupled to the second base station with narrow beam width, high gain antennas.

31. The method of claim 27, wherein the first base station is communicatively coupled to the second base station with a fiber optic link.

* * * * *